May 20, 1924.

H. R. GILSON 1,494,683

VARIABLE ANGLE BIAS CUTTER

Filed May 18, 1920        7 Sheets-Sheet 1

May 20, 1924.

H. R. GILSON

VARIABLE ANGLE BIAS CUTTER

Filed May 18, 1920   7 Sheets-Sheet 3

Inventor.
Henry R. Gilson,
By his Attorney.

May 20, 1924.

H. R. GILSON

VARIABLE ANGLE BIAS CUTTER

Filed May 18, 1920

Inventor.
Henry R. Gilson,
By his Attorney.

May 20, 1924.

H. R. GILSON

VARIABLE ANGLE BIAS CUTTER

Filed May 18, 1920   7 Sheets-Sheet 5

1,494,683

Inventor.
Henry R. Gilson,
By his Attorney.

May 20, 1924.

H. R. GILSON

VARIABLE ANGLE BIAS CUTTER

Filed May 18, 1920

Inventor.
Henry R. Gilson,
By his Attorney.
Ernest Hopkinson

May 20, 1924.

H. R. GILSON

1,494,683

VARIABLE ANGLE BIAS CUTTER

Filed May 18, 1920

Inventor.
Henry R. Gilson,

By his Attorney.

Patented May 20, 1924.

1,494,683

UNITED STATES PATENT OFFICE.

HENRY R. GILSON, OF NEW ROCHELLE, NEW YORK, ASSIGNOR TO MORGAN & WRIGHT, A CORPORATION OF MICHIGAN.

VARIABLE-ANGLE BIAS CUTTER.

Application filed May 18, 1920. Serial No. 382,289.

*To all whom it may concern:*

Be it known that I, HENRY R. GILSON, a citizen of the United States, residing at New Rochelle, county of Westchester, and State of New York, have invented a certain new and useful Variable-Angle Bias Cutter, of which the following is a full, clear, and exact description.

This invention relates to shearing machines, and particularly to a large type thereof that is adapted to sever lengths of rubberized, woven, knitted or corded fabrics on the bias, from a strip for incorporation in tires.

In the manufacture of tires, and particularly cord tires having the cords of successive fabric layers crossed at opposite inclinations to the tread, it is desirable to vary the angular disposition of the crossed cords in different sizes of tires for various reasons.

Heretofore machines for doing this class of work, as exemplified in U. S. patent to Schofield, 844,744, Feb. 19, 1907, have had no adjustment to permit variation of the inclination of the knives to the length of the strip nor have such machines been adapted to cut pieces from a strip of fabric in as perfect a rhomboidal shape as desired, the opposite severed edges being usually slightly curved.

The present invention aims to provide a shearing machine capable of cutting at various angles and preferably on the bias with the cut edges of the rhomboidal piece substantially, if not exactly, parallel. Further, the invention comprehends improved actuating mechanism for the shearing blades. Also it aims to improve the mechanism for removing the cut pieces from the shearing blades without distorting the fabric being cut. It endeavors as well to improve the fabric feeding mechanism and particularly to so connect it with the shearing blades that the adjustment of the latter to vary the angle of cut will also set certain gripping devices forming part of the feeding mechanism so as to effectively grip the cut edge of fabric in the different positions. And generally the invention aims to accomplish the ends stated without sacrifice of efficiency and by an organization and arrangement of parts that is new and novel, permitting the fabric to travel in a more or less horizontal plane whereby the force of gravity may be utilized to hold the fabric flat and in a position readily manipulated both before and after a cutting operation.

With the particular embodiment of the invention illustrated in the drawings in mind, the invention, briefly stated, includes in combination mechanism for feeding predetermined lengths of fabric to shearing blades which are disposed at an inclination to the direction of feed, and a conveyor for removing the cut fabric which conveyor during a fabric severing operation serves as a support or table therefor. The blades of the shearing mechanism and the gripping elements of the feed are disposed in parallel relation and are operatively sustained by supports that permit variation of the inclination of the blades and gripping elements to the direction of fabric feed. Means are provided for driving a conveyor, constituting a preferred form of removing mechanism for the cut widths of fabric, either step by step or continuously, the former preferably, to obtain rhomboidal cut pieces of substantially perfect geometrical outline.

In the embodiment of the invention illustrated in the accompanying drawings,

Figs. 4, 5 and 6 are corresponding side elevations;

Figs. 7 and 8 represent in vertical section a ratchet driving device for an endless conveyor;

Fig. 8 represents the same in sectional elevation with the ratchet gear in quarter section;

Fig. 9 shows an alternative gear drive that may be employed in the housing of Fig. 7 to drive the belt continuously;

Figs. 10, 11 and 11ª represent in front elevation, in side elevation, and in plan respectively a set of transmission gears;

Fig. 12 is a section on the line 12—12 Fig. 2 looking in the direction of the arrows and through the turn table bearing supporting the shearing mechanism;

Fig. 13 shows in elevation a braking mechanism;

Fig. 17 is a detail in cross-section on the line 17—17 Fig. 2 of supporting construction at one side of the fabric gripping fingers;

Figure 2:
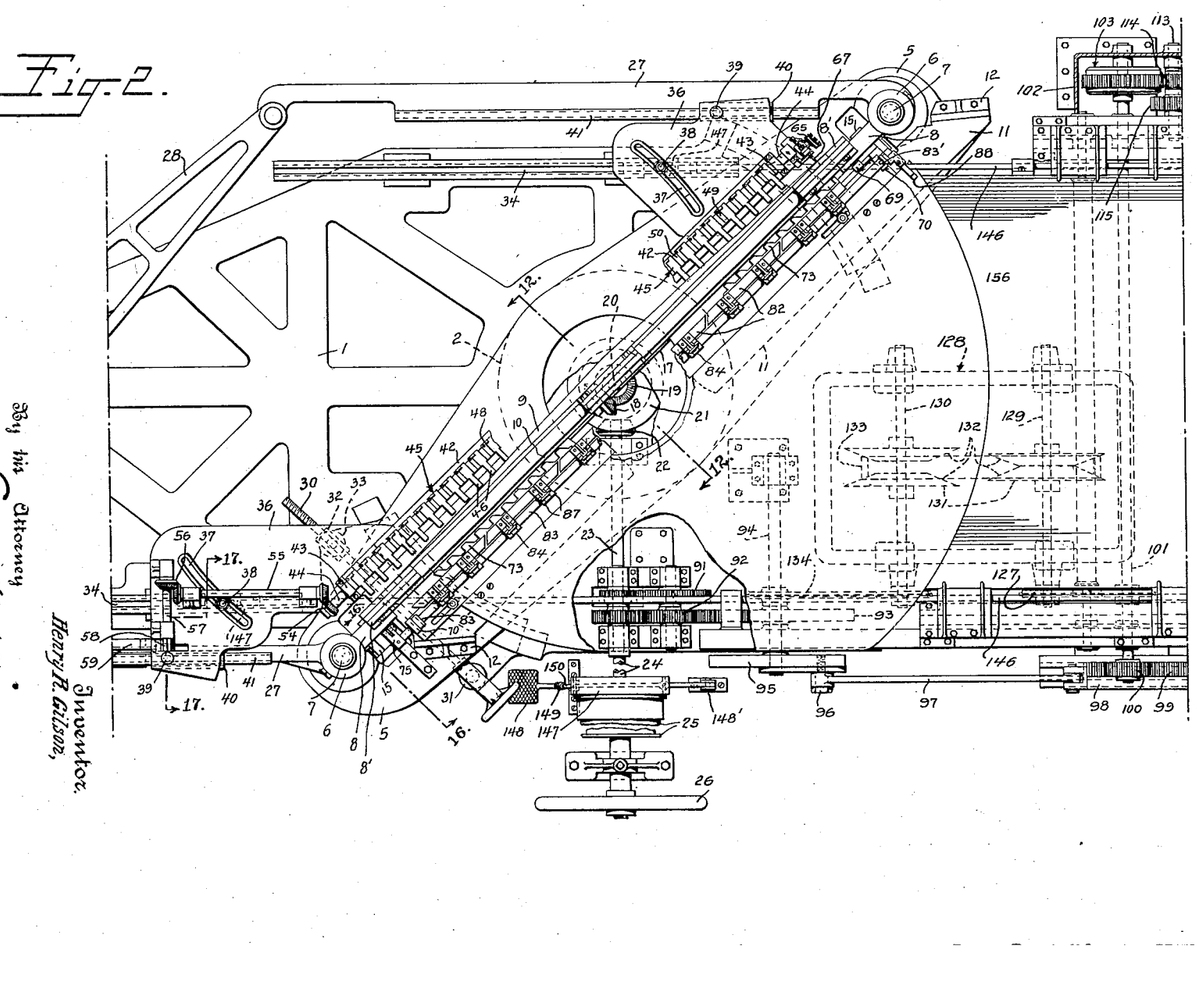
Figures 5, 10, 11, 11A, 12, 13:
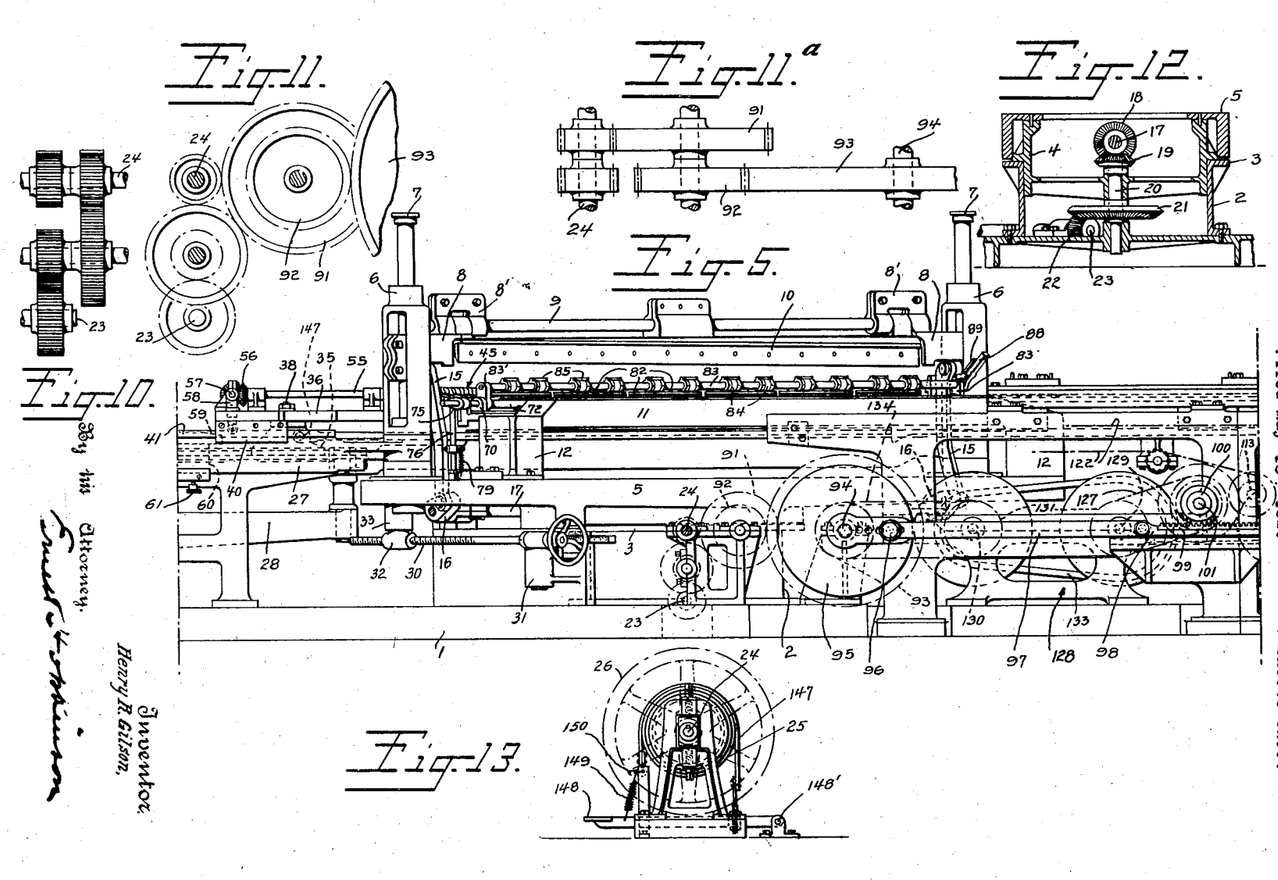

From the base of the machine, indicated at 1, and centrally, rises a cylindrical housing 2, see Fig. 12, whose horizontal upper flange 3 affords a pivoted bearing for a turn table 4 to which is fixed a lever or table 5 of the shape in plan illustrated in Fig. 2. At its opposite ends and at equal distances from its vertical axis, the lever 5 carries upright housings 6 in which rods 7 are slidably supported. To each of the rods 7 a gate bracket 8 is secured and each of the gate brackets is provided with spaced collars 8' for the reception of a rod 9 having a movable or cutting blade 10 fixed thereto, as shown. Preferably the weight of the blade and its parts is borne by suitable concealed springs (not shown) within the guide rods 7, as shown in detail in the previously mentioned patent to Schofield.

Figure 16:
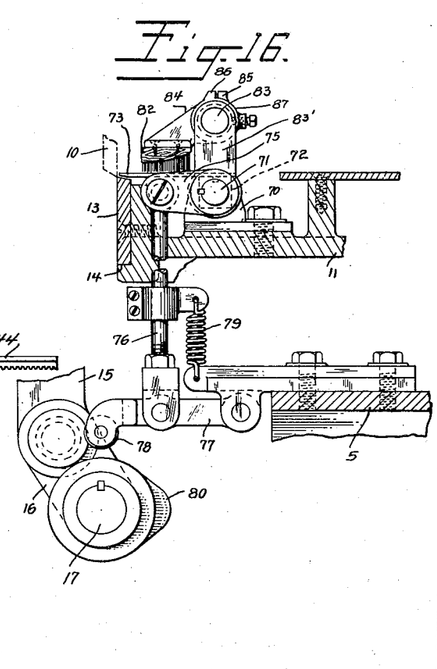
Fig. 16 is a detail in section on the line 16—16 Fig. 2 of mechanism for automatically elevating the freshly cut edge of the fabric leading to the supply for facilitating its seizure by gripping fingers of the feeding mechanism.

On standards 12 at opposite ends of the lever or table 5 is supported a raised platform 11 which carries a ledger blade 13 in a seat 14 machined at one side thereof as illustrated in Fig. 16. The vertical faces of the blades 10 and 13 are substantially parallel but their opposed cutting edges are slightly inclined, viewed from one side or horizontally, for efficiency in cutting to produce a shearing action.

Cutting is effected by actuating the knife 10 through the following mechanism. To the gate brackets 8 at each end of the knife 10 are connected links 15 driven by cranks 16 at remote ends of aligned shaft 17, which are journaled to the under side of the lever or table 5. Mitre gears 18 on the adjacent ends of the shafts 17 are driven by a mitre gear 19 on a vertical shaft 20, see Fig. 12, which is driven through mitre gears 21 and 22 from a horizontal shaft 23 extending to one side of the frame of the machine. Through the reducing gear train illustrated in Fig. 12, the shaft 23 is driven from the main shaft 24 which is provided with a stepped pulley 25 and hand wheel 26 for power or manual operation respectively.

Links 27 are hinged at one end to the extremities of the lever or table 5, preferably below the guide rod housings 6, and the opposite ends of links 27 are pinned to a second lever 28 pivotally supported midway between its ends as indicated at 29. By means of a lead screw 30 rotatably collared at one end to a fixed bracket 31, and threaded at its other end in a nut 32 swiveled to the under side of a lateral projecting portion 33 of the table 5, the linkage composed of the levers 5—28 and links 27, may be turned about the fulcrums or pivot bearings 3 and 29 to set the shearing blades at a desired inclination to the direction in which fabric is fed thereto.

Between the side arms or links 27, and at a distance apart less than the space between them in their closest position are suitably gibbed parallel guideways 34 for cross heads 35, see Figs. 5 and 17. On each cross head is supported a plate 36 provided with an arcuate slot 37. The plates 36 are clamped to the cross heads 35 by bolts 38 after the shearing blades have been set at the desired inclination being free to move about pins 39 as a fulcrum during the adjustment of the blades. The pins 39 are anchored in slide blocks 40 embracing a suitably machined guide bar fixed to or integral with the side arms 27. The center of curvature of the slots 37 lies at the intersection of a line connecting the pins 39 with a line between pivots 4—29.

The spaced plates 36 are connected by an inverted channel bar 42. In bearings 43 on the opposite ends of bar 42 is sustained a shaft 44 carrying a suitable number of gripping devices indicated generally by the numeral 45. Referring to the enlarged detail shown in Figs. 21 and 22 each of these gripping devices comprises a finger 46 loosely collared on the shaft 44 and having at the rear a projection 47 that is adapted to be engaged by the offset projection 48 of a split collar 49 which is fixed to the shaft. Spacing collars 50 separate each set of gripping devices on the shaft 44. Each finger portion 46 is apertured to receive a headed rod 51 which depends through and below the channel iron 42 between which latter and the lower headed end of the rod is interposed a coil spring 52 which normally urges the finger 46 yieldingly down upon a stationary gripping member 53 brazed or otherwise secured to the channel iron in the overhanging position illustrated.

The gripping devices are actuated to seize a freshly cut edge of a strip of fabric after the knife has ascended out of the way, and to pull the fabric to present a predetermined width thereof to be cut. These gripping devices let go of the fabric just before the blades cross each other and, after finishing their stroke, return to starting position ready to grip and advance the next width of fabric to be cut.

The gripping devices are opened at the end of a feeding operation by devices supported on that plate 36 which is shown at the lower side of Fig. 2 of the drawings. The shaft 44 is connected by bevel gears 54, shaft 55, and mitre gears 56 to a cross shaft 57 having, as shown in Figs. 2, 5 and 17, the latter the best, a depending rock arm 58 which is adapted to ride up and on a cam 59 just before a cutting operation starts. The stationary cam 59 is preferably carried by a bracket 60 adjustably secured by means of thumb screws 61 to a link or side arm 27. When the rock arm 58 rides upon the cam 59, through the connections described, the shaft 44 will be rotated in a clock-wise direction as viewed in cross-section in Fig. 22, to cause the offset portion 48 of the collar 49 fast thereon to engage the rearwardly extending projection 47 of the finger portion 46 which is loose on the shaft, thereby raising the finger against the pressure of spring 52 and to the dotted line position shown in Fig. 22. In this way the gripping fingers are opened to release the fabric at or rather very shortly before the end of a feeding stroke.

Figures 18, 19, 20, 21, 22:
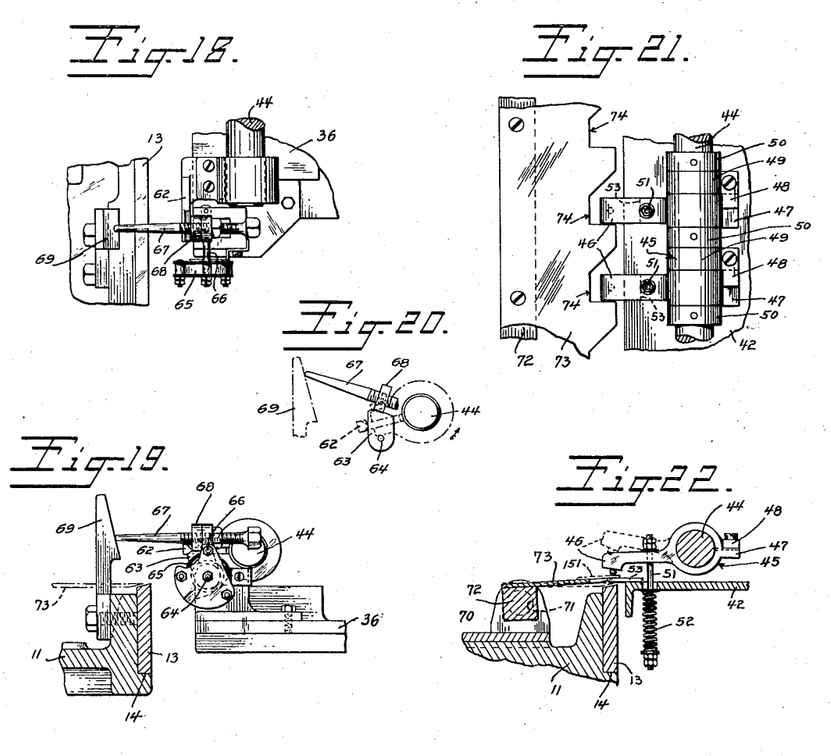
Figs. 18, 19, and 20 represent in plan and elevation details of tripping mechanism for closing the gripping fingers.
Figs. 21 and 22 show in plan and vertical section respectively the relation and structure of a stripping plate and gripping fingers.

In raising the gripping fingers 46 to the dotted line position shown in Fig. 22, an L-shaped arm 62, see Figs. 18–19 and 20, fast on the other end of the shaft 44 is raised from the position shown in Fig. 20 to the position shown in Fig. 19 in which it is held by movement of a detent 63 about its fulcrum 64 under the action of a coil spring 65 disposed vertically in parallelism with the detent 63. One end of the spring is connected to the detent by a pin 66 projecting laterally therefrom while the other end is suitably anchored to a fixed part of the machine. In this way the gripping jaws are held open during their return stroke and preparatory to the next fabric gripping operation.

When the gripping devices 46—53 reach the end of their return stroke, a trip 67 in the form of a screw threaded in an upright extension 68 of the detent 63, encounters the broad inclined face of a stationary cam 69 suitably disposed in its path and turns the detent 63 in a clock-wise direction, as viewed in Fig. 19, from beneath the bent arm 62 which is fast on the shaft 44. In the ensuing movement of the parts from the position shown in Fig. 19 to the position illustrated in Fig. 20, the gripping fingers 46 are freed to the action of their individual springs 52 and thereby brought down upon the previously cut edge of fabric which is resting on the stationary fingers 53. Thus the fabric is gripped for the next feeding operation.

It is desirable to lift the previously cut edge from the ledger blade 12 for its seizure by the gripping fingers 46—53. To this end there is mounted on the support 11 for the blade, see Fig. 16, a pair of brackets 70 and in these brackets, which are located at opposite sides of the machine, are journaled the round ends 71 of a square bar 72 carrying a stripping blade 73. This stripping blade 73 is coextensive with the gripping elements and at the edge thereof adjacent the ledger blade 13 is provided with a series of notches 74 spaced the same distance apart as the several gripping fingers 46.

The stripping blade 73 normally occupies the position shown in Fig. 16 slightly above or resting on the blade 13, but is intermittently raised just before the grippers 46—53 pass over the ledger blade. This intermittent elevation of the stripping blade is accomplished by the mechanism illustrated in detail in Fig. 16. As therein shown the bar 72 is provided with a crank arm 75 linked as indicated at 76 to a lever 77 carrying a roller 78 at its free end. Normally the link 76 is pulled down by a tension spring 79 to hold the stripping blade down upon or contiguous the ledger blade, but a cam 80 fast on one of the rotating shafts 17 engages the end of lever 77 at the right time in the cycle of operations to elevate the stripping blade.

Figure 15:
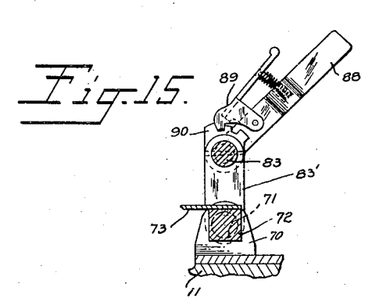
Fig. 15 is a detail in section showing a manual device for elevating fabric smoothing brushes.

The fabric operated upon is conducted to the blades beneath a series of combs or brushes 82 which, as illustrated in Fig. 16, are loosely collared to a rod 83 suitably supported in crank-bracket arms 83' keyed to the ends 71 of bar 72 and movable with the latter. The loose collars 84 are provided with over hanging lugs 85 adapted to be engaged by lugs 86 of restraining collars 87, see Fig. 2, on opposite sides thereof. The collars 87 are fast on the rod 83 and when this rod is turned by a handle 88 at one end thereof, the brushes may be elevated to facilitate the initial introduction of a strip of fabric to the shearing blades. The shaft 83 may be held in a position allowing the brushes 82 to rest freely and of their own weight upon the fabric passing over the stripping blade 73 by a spring operated latch 89 which cooperates with a suitably fixed and notched plate 90, as shown in Fig. 15 of the drawings.

The power shaft 24 carries a pair of pinions, as shown in Figs. 2 and 10 from one of which power is transmitted as has already been described, to drive the knife. From the second of these pinions power is transmitted by reducing gears 91 and 92 to drive a larger gear 93 which is fast on a shaft 94 suitably journaled in brackets supported by the base 1 and carrying a crank disk 95. A radially adjustable wrist pin 96 in the disk is linked as indicated at 97 to a slide bar 98 formed with a rack 99. Reciprocation of the rack 99 through the pinion 100 oscillates a transverse shaft 101 which at the opposite side of the machine within a demountable housing 102 carries a ratchet gear 103 which is illustrated in detail in Figs. 7 and 8.

The ratchet gear consists of opposed spaced side members 104 which are clamped together by bolts 105 and in their channeled periphery is seated a ring 106 provided externally with gear teeth 107 and internally with ratchet teeth 108. The latter are adapted to be engaged by pawls 109 pivoted on pins 110 and normally urged outward by coil springs 111 suitably looped about the pawls and having their ends anchored to pins 112. Through this ratchet gear reciprocation of the toothed slide bar 98 in one direction will transmit power through the teeth 107 and in the opposite direction will be ineffective so to do.

Parallel to the shaft 101 is a stub shaft 113 equipped with reducing gears 114 and 115, the latter of which is in mesh with a pinion 116 on a shaft 117 which, through a flexible belt or chain 118, drives a shaft 119 spaced thereabove in parallelism. On the shafts 117 and 119 are fixed rollers 120 and 121 driving belt conveyor 122 looped about them for increasing the friction between the belt and the lower roller; an idler 123 is arranged therebetween as illustrated diagrammatically in Fig. 14.

Figures 1, 23:
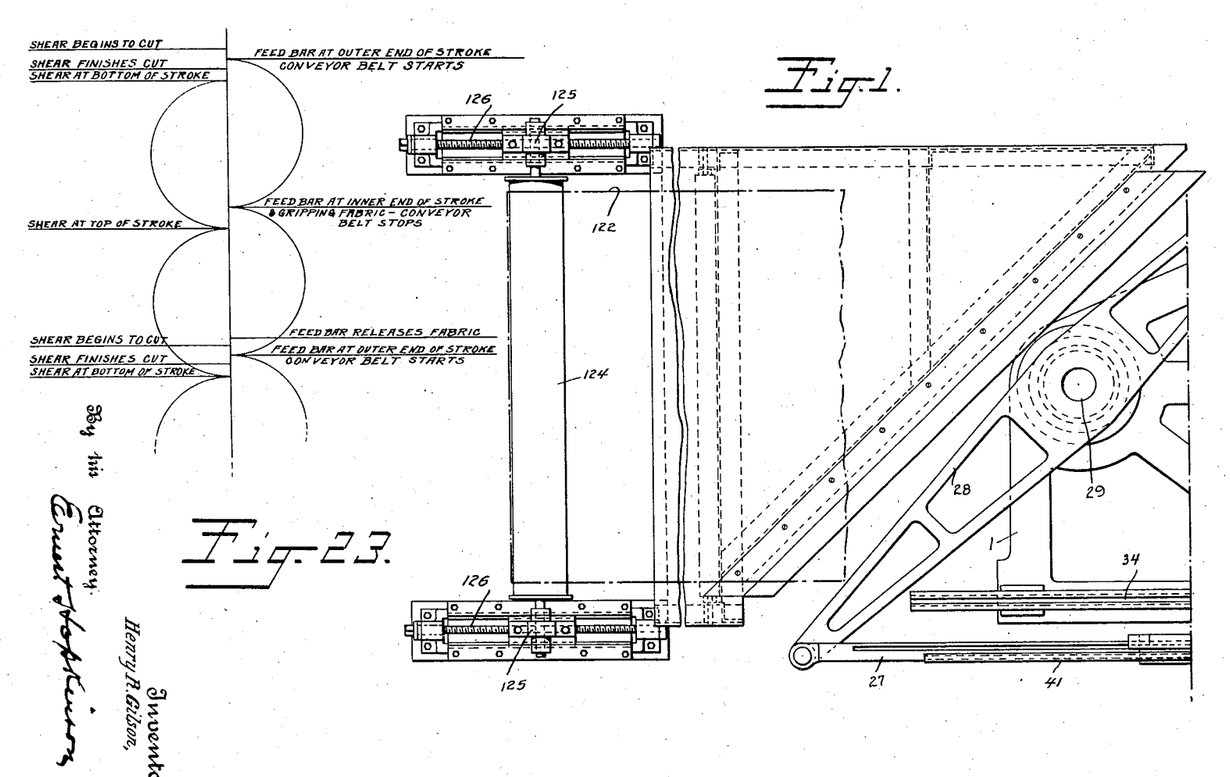
Figs. 1, 2 and 3 illustrate portions of the machine of the present invention in plan view, the size of which prevents clear illustration in a single figure.
Fig. 23 is a motion diagram showing the relative timing of the component parts of the machine.
Figures 4, 7, 8, 9:
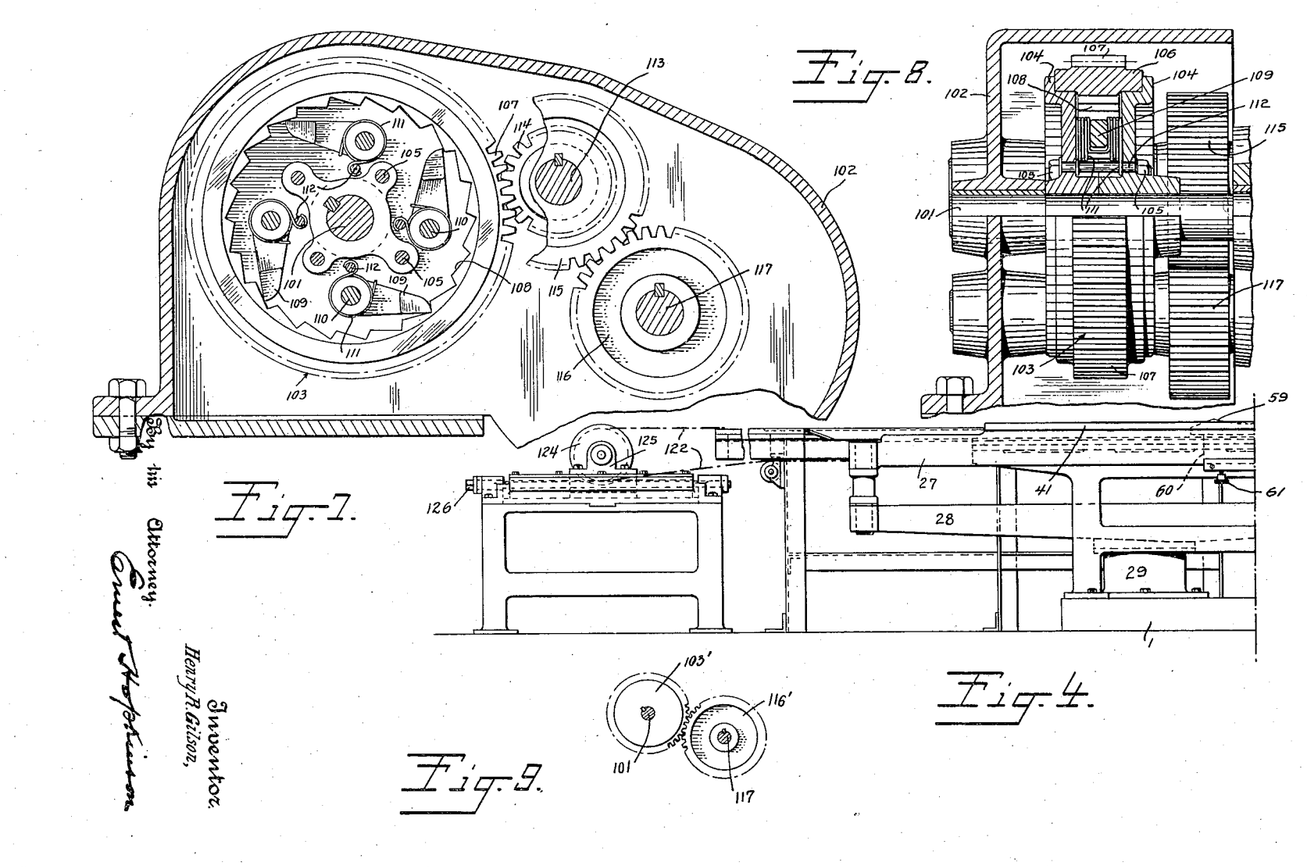

The belt 122 is endless, preferably but not necessarily continuous from side to side, and at the opposite end of the machine, see Figs. 1 and 4, encircles a roller 124 which is journaled at opposite sides of the machine in guide blocks 125 that are adjustable by lead screws 126 to take up slack. The belt 122 constitutes a conveyor or fabric remover. It passes immediately below the ledger blade 13 so as to minimize and practically eliminate distortion of the width of fabric being cut as the cutting progresses from one side to the other of the strip. By locating the conveyor close to the ledger blade the width of fabric cut is in a large part supported throughout the cutting operation and an objectionable tendency to wrinkle at the side heretofore present in such machines, avoided. Through the ratchet gear 103 and driving connections associated therewith, the conveyor is shifted step by step between the completion of one cut and the initiation of the next cutting operation. Throughout the cutting operation the conveyor belt is substantially stationary and hence there is no appreciable movement of the width of fabric being cut during its severance from the strip supply.

The above described step by step or intermittent operation of the conveyor is desirable, if not necessary, to cut fabric as wide as, say 60 inches, i. e., the width here referred to being the width across the machine. But when strips are being cut from fabric that is narrow, or when the use of the cut strips does not demand great precision the conveyor 122 may be run continuously, more economically. To this end the stub shaft 113 and the gears 114 and 115 in the demountable housing 102 are removed together with the pinion 116 on the shaft 117, and the ratchet gear 103 on shaft 101. The large gear 116' is then mounted on the shaft 117 to mesh directly with a gear 103' which has been substituted for the ratchet gear 103 as illustrated in Fig. 9 of the drawing. When the pinion 100 on the shaft 101 (and in mesh with the rack 99) is also removed, the shaft 101 may then be driven continuously in any suitable manner as by a flexible connection 127, see Fig. 5, with a variable speed transmission device indicated generally by the numeral 128. But if desired, the flexible connection 127 may be made to drive shafts 117 and 119 directly with the pinion 100 removed, of course as before stated, from engagement with rack 99.

In the form illustrated in dotted lines in Fig. 2 this transmission device consists of parallel shafts 129 and 130, each supporting shiftable disks 131 with opposed convergent conical surfaces 132, cooperating with a flexible link belt 133 the side edges of whose links are inclined to frictionally engage the conical surfaces 132 of the disks 131. These disks being shiftable as before stated, the effective driving circumference of either may be varied to obtain any desired change of speed. The shaft 130 at one end is flexibly connected, as by a chain and sprocket illustrated diagrammatically at 134, to the shaft 94 carrying the crank disk. The variable speed transmission device 128, may be of the well known Reeves type illustrated, but it will be understood that any suitable means may be employed to drive the belt conveyor continuously, preferably however from the main-power shaft 24. But a motor or other separate source of power might be employed therefor.

It will therefore be understood that the conveyor 122 may be driven either step by step for cutting widths of fabric with exactly parallel edges, especially when the strip from which they are cut is of great width, or the conveyor may be driven continuously where the strips are not required to be cut with great accuracy or where the width of fabric from which they are cut is not great enough to necessitate the conveyor being stationary while the cutting operation is performed.

There remains to be described the feeding mechanism for reciprocating the gripping fingers 46—53 which are mounted above the channel bar 42. The channel bar 42 is secured at its opposite ends to the two plates 36 which are each adjustably attached by the bolt and slot connection 37 and 38 to the cross head 35 and also supported by the shoes 40 slidable on the links or side arms 27.

Figure 3:
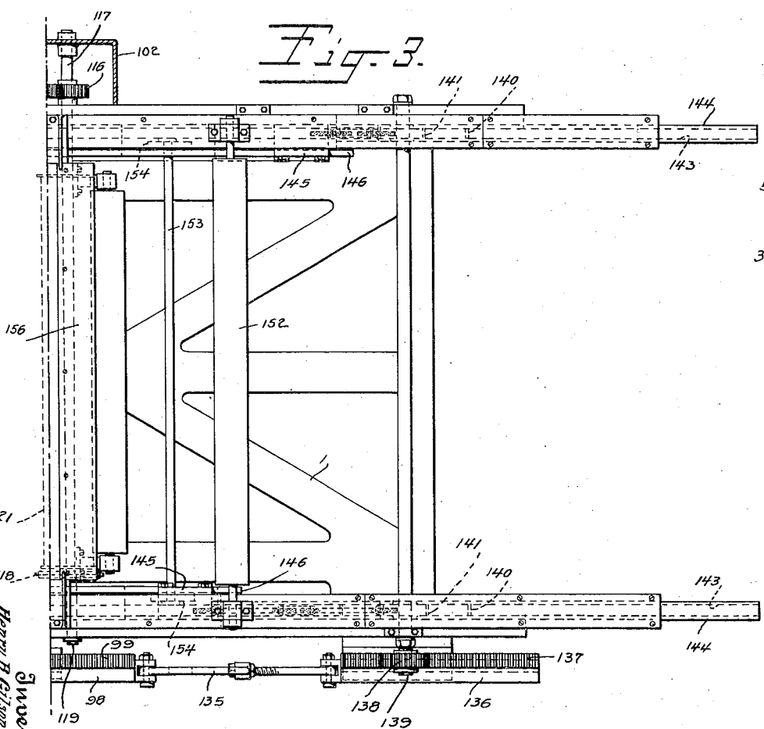
Figure 6:
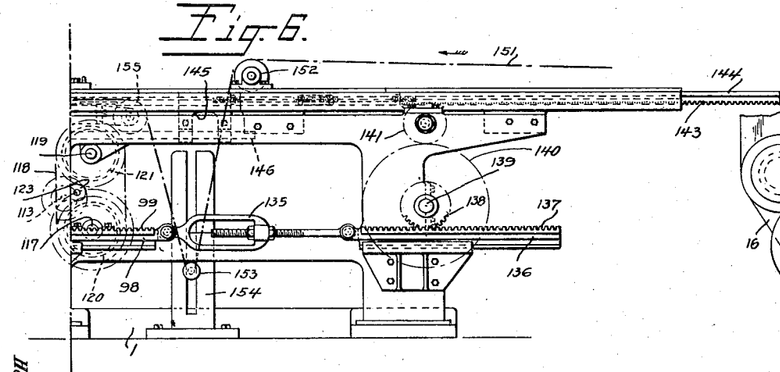
Figure 11:
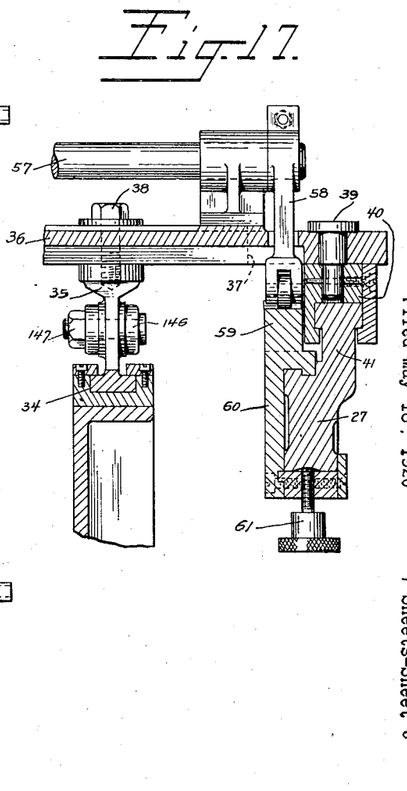

Referring to Figs. 3 and 6 for the immediate present, the slide bar 98, is linked by a turn buckle 135 to another slide bar 136 which is provided laterally with a rack 137 driving a pinion 138 on a shaft 139 which carries large gears 140 at opposite sides of the machine driving pinions 141. Each pinion 141 engages a rack 143 on a slide bar 144 which at its forward or left hand end, (with reference to Fig. 6) carries a depending bracket 145 with split collared ends adjustably secured to rods 146. There are two rods 146 extending along opposite sides of the machine and each of these rods is pinned to a cross head 35 as indicated at 147 to actuate the feeding or gripping devices 46, etc.

Through the above described connections reciprocation of the slide bar 136 will be effective to push and pull upon the rods 146 which are pinned to the cross heads 35 and thereby the gripping fingers may be reciprocated to feed the fabric a predetermined distance between cutting operations. This action is effected through the parts described whether the conveyor be moved step by step or continuously, it being remembered that the pinion 100 is removed from engagement with the rack 99 when the conveyor is operated continuously.

About the stepped belt pulley 25 a band 147 may be looped with its opposite extremities connected to a foot lever 148 fulcrumed at 148' on the floor adjacent the machine. Normally the foot lever is held elevated by a tension spring 149 which is fixed to an upright 150. In case of emergency or to slow down the operation of the machine, the operative may depress the treadle 148 to stop or slow down the operation of the machine.

Figure 14:
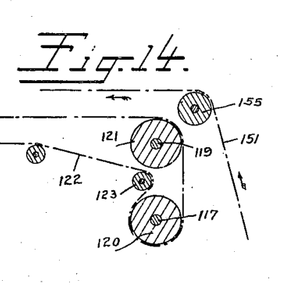
Fig. 14 illustrates diagrammetically the paths of an endless conveyor and a strip of fabric on the way to the shearing mechanism.

In use, with the power off and the machine idle, a strip of fabric indicated at 151, Figs. 6 and 14, is conducted from a roller or other source of supply at one end of the machine in the direction of the arrow, Fig. 6, over a roller 152 and under a slack take-up 153 which is guided by the slotted bracket 154. The fabric is conducted thence over a roller 155 to a table 156, preferably corrugated longitudinally to reduce the friction between it and the fabric, this feature being especially desirable where the fabric is frictioned or otherwise coated with adhesive substance such as rubber composition. From the table 156 the fabric passes under the brushes 82, which may be held elevated for the introduction of the fabric by the handle 88 and latch 89. The brushes 82 are free to gravitate down upon the fabric passing between them and the stripping blade 73 whose forward edge terminates just short of the vertical cutting plane and normally rests upon or contiguous the top of the ledger blade 13.

With the fabric positioned as described, the main shaft 24 is started and the operations of the machine follow in the sequence illustrated in the motion diagram Fig. 23, which illustrates the timing when the conveyor is driven intermittently or step by step, as is preferred for accurate work. The conveyor, when operated intermittently, starts when the fabric gripping elements are at the outer end of their stroke with their jaws open and it stops when the fabric gripping elements are at the inner end of their stroke with the jaws closed upon the previously cut edge of fabric. During the feeding of the fabric the conveyor belt is idle. The cutting operation proper takes place during a small fraction of the descending stroke of the blade 10, approximately $\frac{1}{6}$ to $\frac{1}{8}$ thereof, and when the machine is being operated at a high speed the cutting of the fabric is performed in a small fraction of a second. And while the driving pulleys 120—121 for the conveyor belt start substantially midway between the beginning and ending of a cutting operation, the removal of the fabric being cut does not begin until the cut is finished or substantially so, because (1) of the great length of belting between the driving pulleys and the shearing blades, (2) of the slack in the conveyor that must be taken up before there is any movement of that portion of the conveyor which is adjacent the blades and supporting a width of fabric and (3) of the fact that the wrist pin 96 is just crossing dead center and necessarily imparts but slight rectilinear movement to the slide bar 98. Therefore, when actuated intermittently, the conveyor constitutes a substantially stationary support for the fabric during a cutting operation and between cutting operations it is movable step by step.

The invention is not confined to the exact mechanism illustrated and described, and many changes may be made therein without departing from the broad underlying principles thereof. For instance, the guideways 34 and supporting cross heads 35 for some classes of work may be omitted, the slide blocks 40 to which the blades 36 are loosely pinned being capable of supporting the opposite ends of the cross bar 42 carrying the gripping fingers. And any suitable form of cutting mechanism may be substituted for that shown. And moreover the fabric feeding mechanism may be varied within certain broad aspects of the invention as also may the means for adjusting the angular relation of the blades to the direction of feed. And within its broadest aspect the invention comprehends any adjustment between the feeding mechanism and the cutting mechanism by which their relation is varied to obtain the desired bias cut. Reference should, therefore, be made to the accompanying claims for an understanding of the scope of the invention.

Having thus described my invention, what I claim and desire to protect by Letters Patent is:

1. In a shearing machine, in combination, relatively stationary and movable blades, a member supporting the blades, fabric gripping devices, means for actuating the blades and gripping devices, said member being movable in a plane parallel to the movement of the gripping devices, and connections between said member and the gripping devices whereby the latter may be shifted with the blades.

2. In a shearing machine, in combination, relatively stationary and movable blades, a member supporting the blades, fabric gripping devices, and means for actuating the same to feed a strip to the blades, said member being pivoted for movement in parallelism to the plane in which the gripping devices are moved, and connections between said member and gripping devices whereby the latter may be adjusted therewith.

3. In a shearing machine, in combination, relatively stationary and movable blades, a member supporting the blades, and means for feeding fabric to the blades a predetermined length at a time, said member being pivoted intermediate its ends to permit adjustment of the blades in the plane of the feed of the fabric.

4. In a shearing machine, in combination, relatively stationary and movable blades, a member supporting the blades, fabric gripping devices, means for actuating the blades and fabric gripping devices, said member being pivoted intermediate its ends to permit adjustment of the blades in the plane of the feed of the fabric, and connections between the gripping devices and the blade for shifting the former with the latter when adjustment of the blades is effected.

5. In a shearing machine, in combination, relatively stationary and movable blades, fabric gripping devices, mechanism for supporting said blades and gripping devices, said mechanism being adjustable to position the blades and devices at angles to the direction of feed, and means for actuating the blades and devices.

6. In a shearing machine, in combination, relatively stationary and movable blades, means for feeding fabric to the blades including fabric gripping devices, means for actuating the blades, and supporting mechanism for said blades and gripping devices permitting adjustment thereof in a plane parallel to the plane of feed, said supporting mechanism including a parallel motion linkage.

7. In a shearing machine, in combination, relatively stationary and movable blades, means for feeding fabric to the blades including fabric gripping devices, means for actuating the blades, and supporting mechanism for said blades and gripping devices permitting adjustment thereof in a plane parallel to the plane of feed, said supporting mechanism including intermediately pivoted levers and duplicate links of equal length hinged to said levers at equal distances from their respective pivots.

8. In a shearing machine, in combination, relatively stationary and movable blades, means for actuating the movable blade, fabric gripping devices, means for actuating the fabric gripping devices to feed the fabric, and means for supporting the blades and fabric gripping devices permitting simultaneous adjustment thereof without disconnection from the actuating means.

9. In a shearing machine, in combination, relatively stationary and movable vertically arranged blades, means for actuating the movable blade, fabric gripping devices, means for actuating the devices to feed the fabric, and means for supporting the blades adjustable in a plane transverse the vertically arranged blades.

10. In a shearing machine, the combination with cutting blades and means for actuating the same, of fabric feeding mechanism including sets of gripping fingers, a rock shaft, means on the rock shaft for operating at least one member of said sets of fingers, supports at opposite ends of and for said rock shaft, means for reciprocating said supports in the direction of the length of the machine, and adjustable connections between the support and the shaft.

11. In a shearing machine, relatively stationary and movable blades, a pivoted lever for both of said blades, a second pivoted lever, links connecting the ends of said levers to form a parallel motion device, in combination with fabric feeding mechanism including gripping fingers, a shaft operatively supporting said gripping fingers, a member supporting cooperating fingers, means at opposite ends of the shaft for supporting it and said member, means for reciprocating the last named supporting means in directions parallel to the direction of feed, and hinged connections between said support and links whereby the blades and gripping devices may be adjusted in one operation.

12. In a shearing machine, fabric cutting blades, means for actuating the cutting blades, fabric feeding mechanism including fabric gripping elements, means for adjusting the blades and fabric gripping elements, to vary their angular relation to the direction of feed and including a parallel motion linkage, and supports slidable on opposed parallel members of said linkages sustaining said fabric gripping elements.

13. A shearing machine having blades, and means for actuating the blades, in combination with feeding mechanism including fabric gripping elements, members supporting said fabric gripping elements, cross heads sustaining and pivotally connected to said members, and parallel guideways for said cross heads.

Signed at New York, N. Y., this 15th day of May, 1920.

HENRY R. GILSON.

Witnesses:
M. V. FINNCANE,
C. L. FOUTZ.